United States Patent [19]

Haidos et al.

[11] Patent Number: 5,523,115
[45] Date of Patent: Jun. 4, 1996

[54] MAGNETIC RECORDING MEDIUM HAVING RADIATION CURABLE BINDER WITH α-METHYLSTYRENE UNSATURATION

[75] Inventors: John C. Haidos, St. Paul; Ravindra L. Arudi, Woodbury; Nelson T. Rotto, North St. Paul, all of Minn.

[73] Assignee: Minnesota Mining and Manufacturing Company, St. Paul, Minn.

[21] Appl. No.: 353,710

[22] Filed: Dec. 12, 1994

Related U.S. Application Data

[62] Division of Ser. No. 775,145, Oct. 9, 1991, Pat. No. 5,380,905.

[51] Int. Cl.$^6$ ............................................................. G11B 5/00
[52] U.S. Cl. ........................... 427/128; 427/130; 427/496; 427/502; 252/62.54; 428/694 BC
[58] Field of Search ................................. 427/496, 502, 427/128, 130; 252/62.54; 428/694 BC

[56] References Cited

U.S. PATENT DOCUMENTS

| | | | |
|---|---|---|---|
| 4,429,096 | 3/1984 | Schaefer | 526/287 |
| 4,448,846 | 5/1984 | Chang et al. | 428/412 |
| 4,617,349 | 10/1986 | Nasu et al. | 525/123 |
| 4,632,957 | 12/1986 | Welsh et al. | 524/548 |
| 4,663,184 | 5/1987 | Hegel | 427/44 |
| 4,761,435 | 8/1988 | Murphy et al. | 522/46 |
| 4,769,419 | 9/1988 | Dawdy | 525/111 |
| 4,788,303 | 11/1988 | Waterman | 549/525 |
| 4,839,230 | 6/1989 | Cook | 428/423.1 |
| 4,853,478 | 8/1989 | Colvin et al. | 560/32 |
| 4,859,500 | 8/1989 | Kakuta et al. | 427/128 |
| 4,889,895 | 12/1989 | Chernega et al. | 525/278 |
| 4,976,989 | 12/1990 | Aonuma et al. | 427/48 |

FOREIGN PATENT DOCUMENTS

| | | |
|---|---|---|
| 230957 | 12/1985 | Germany . |
| 58-146043 | 8/1983 | Japan . |
| 61-123854 | 6/1986 | Japan . |
| 63-162664 | 7/1988 | Japan . |
| 3-059647 | 7/1989 | Japan . |

OTHER PUBLICATIONS

Dexter et al., "m–TMI, A Novel Unsaturated Aliphatic Isocyanate", *Journal of Coatings Technology*, vol. 58, No. 737, pp. 43–47 (Jun. 1986).

Shirakawa, S. et al, *Chemical Abstracts*, 114(6) 44182n, (Feb. 1991).

*Primary Examiner*—Stevan A. Resan
*Attorney, Agent, or Firm*—Gary L. Griswold; Walter N. Kirn; David B. Kagan

[57] ABSTRACT

The present invention provides magnetic recording media comprising a magnetizable layer and optionally a backside coating provided on a nonmagnetizable substrate. At least one of the magnetizable layer and the optional backside coating comprises a polymeric binder, wherein the polymeric binder is obtained from reactants comprising a free radical generator and a radiation curable polymer. The radiation curable polymer comprises a plurality of radiation curable, α-methylstyrene moieties of the formula

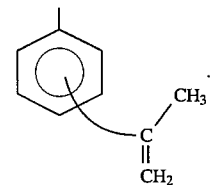

20 Claims, No Drawings

MAGNETIC RECORDING MEDIUM HAVING RADIATION CURABLE BINDER WITH α-METHYLSTYRENE UNSATURATION

This is a division of application Ser. No. 07/775,145 filed 10/09/1991 now U.S. Pat. No. 5,380,905.

FIELD OF THE INVENTION

The present invention relates to magnetic recording media, and more particularly to magnetic recording media in which the binder of the magnetizable layer or the backcoat layer is derived from a radiation curable polymer having α-methylstyrene unsaturation.

BACKGROUND OF THE INVENTION

Magnetic recording media generally comprise a magnetizable layer coated on at least one side of a nonmagnetizable substrate. For particulate magnetic recording media, the magnetizable layer comprises a magnetic pigment dispersed in a polymeric binder. The magnetizable layer may also include other components such as lubricants; abrasives; thermal stabilizers; antioxidants; dispersants; wetting agents; antistatic agents; fungicides; bacteriocides; surfactants; coating aids; nonmagnetic pigments; and the like.

Some forms of magnetic recording media, such as flexible magnetic recording tape, also have a backside coating applied to the other side of the nonmagnetizable substrate in order to improve the durability, conductivity, and tracking characteristics of the media. The backside coating typically comprises a polymeric binder, but may also include other components such as lubricants; abrasives; thermal stabilizers; antioxidants; dispersants; wetting agents; antistatic agents; fungicides; bacteriocides; surfactants; coating aids; nonmagnetic pigments; and the like.

The magnetizable layer and the backside coating, if any, of a majority of conventional magnetic recording media are derived from materials which require curing in order to provide magnetic recording media with appropriate physical and mechanical properties. To prepare such magnetic recording media, the uncured components of the magnetizable layer or the backside coating, as appropriate, are dissolved in a suitable solvent and milled to provide a homogeneous dispersion. The resulting dispersion is then coated onto the nonmagnetizable substrate, after which the coating is dried, calendered if desired, and then cured.

Curing can be achieved in a variety of ways. According to one approach, the polymeric binder of the magnetizable layer or the backside coating is derived from hydroxy functional polymers which rely upon a chemical reaction between the hydroxy functionality and an isocyanate crosslinking agent to achieve curing. The isocyanate crosslinking agent is typically added to the dispersion just prior to the time that the dispersion is coated onto the substrate.

This approach, however, has a number of drawbacks. For example, the coating will have poor green strength until the cure reaction has progressed sufficiently. As a result, the coating will be susceptible to damage during subsequent processing unless an inconvenient and expensive time delay is incorporated into the manufacturing process. Moreover, after the isocyanate crosslinking agent is added to the dispersion, the viscosity of the solution begins to gradually increase as crosslinking reactions take place. After a certain period of time, the viscosity of the dispersion becomes sufficiently high such that it is then extremely difficult to filter and coat the dispersion onto the nonmagnetizable support.

Radiation curable dispersions have been used as an alternative to isocyanate curable formulations. For radiation curable dispersions, the dispersion is coated onto the substrate, dried, calendered if desired, and then irradiated with ionizing radiation to achieve curing. Radiation curable dispersions are capable of providing, fast, repeatable, controlled crosslinking, thereby eliminating the inconvenient and expensive delays associated with isocyanate curable formulations.

Traditionally, radiation curable formulations have relied upon the reactivity of the carbon-carbon double bonds of acrylates, methacrylates, methacrylamides, acrylamides, and the like to achieve crosslinking. Unfortunately, however, magnetic dispersions prepared from such materials tend to undergo unwanted, premature crosslinking reactions under ambient conditions to form insoluble gels. These dispersions are especially prone to suffer from such premature crosslinking and gellation during dispersion milling. This unfortunate tendency to undergo such premature crosslinking and gellation becomes worse as the weight loading of the magnetic oxide in the dispersion is increased. This problem makes it extremely difficult to manufacture magnetic recording media that are derived from radiation curable materials.

Previous investigators have resorted to the use of free radical scavengers in an attempt to control unwanted crosslinking and gellation of acrylate, methacrylate, and acrylamide materials. However, free radical scavengers provide only limited protection against unwanted crosslinking and gellation inasmuch as the free radical scavenger gets used up in the course of scavenging free radicals.

SUMMARY OF THE INVENTION

The present invention provides improved radiation cured magnetic recording media which are prepared from formulations that are much less susceptible to the premature crosslinking and gellation problems associated with acrylate, methacrylate, methacrylamide and acrylamide materials. In one aspect, the advantages of the present invention are achieved by a magnetic recording medium comprising a magnetizable layer provided on a nonmagnetizable substrate. The magnetizable layer is prepared from components which comprise a magnetic pigment dispersed in a polymeric binder. The polymeric binder is obtained from reactants comprising a free radical generator and a radiation curable polymer, said radiation curable polymer comprising a plurality of radiation curable α-methylstyrene moieties of the formula

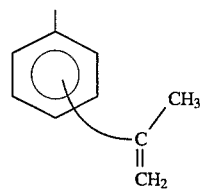

wherein this formula represents

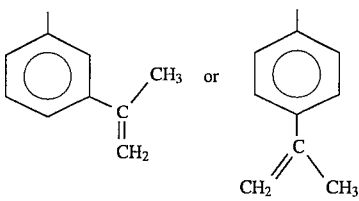

The free radical generator is used in an amount effective to induce crosslinking of the α-methylstyrene moieties when the radiation curable polymer is exposed to ionizing radiation.

In another aspect, the present invention concerns a magnetic recording medium comprising a nonmagnetizable substrate having first and second major surfaces. A magnetizable layer is provided on the first major surface, and a backside coating is provided on the second major surface. The backside coating is prepared from components which comprise a polymeric binder. The polymeric binder is obtained from reactants comprising the free radical generator and the radiation curable polymer as described above.

In another aspect, the present invention concerns a method of making magnetic recording media. In a first step, ingredients comprising a magnetic pigment, the radiation curable binder described above, and a solvent are milled to form a magnetic dispersion. Next, additional ingredients comprising a free radical generator and additional solvent are blended into the dispersion. The weight ratio of the free radical generator to the radiation curable polymer is in the range 1:5 to 1:1. The additional solvent is added in an amount such that the magnetic dispersion comprises 45 to 75 weight percent solvent. The magnetic dispersion is then coated onto a nonmagnetizable substrate. Optionally, the coated nonmagnetizable substrate may be passed through a magnetic field in order to orient or randomize the magnetic orientation of the pigment. The coated nonmagnetizable substrate is then dried, whereby a dried magnetic coating on the nonmagnetizable substrate is formed. The dried magnetic coating optionally may be calendered, if desired, and then is cured with ionizing radiation.

According to the present invention, the free radical generator is a material that is capable of propagating free radicals upon exposure to ionizing radiation, e.g., ultraviolet radiation (in the presence of a photosensitizer) or electron beam radiation. Examples of free radical generators suitable in the practice of the present invention include acrylates, methacrylates, methacrylamides, and acrylamides. For purposes of the present invention, acrylates, methacrylates, methacrylamides, and acrylamides include monomeric, oligomeric, and polymeric materials.

Our investigations have shown that pigment-induced autoxidation of the magnetic dispersion ingredients is one of the causes of the premature crosslinking and gellation problem associated with magnetic pigment dispersions prepared from acrylate, methacrylate, methacrylamide and acrylamide materials. High surface area pigments such as cobalt-modified iron oxides, barium ferrite, and metal particle pigments, in particular, have a greater tendency to induce autoxidation relative to other kinds of magnetic pigments. Such autoxidation tends to generate free radicals which, in the presence of highly reactive acrylate, methacrylate, methacrylamide and acrylamide materials, initiate premature crosslinking and gellation. This problem is aggravated by the ketone solvents generally used to prepare magnetic pigment dispersions as well as by the energy released during dispersion milling.

The present invention overcomes the problem of premature crosslinking and gellation by using a radiation curable binder having α-methylstyrene carbon-carbon double bonds. The reactivity of the α-methylstyrene carbon-carbon double bond can be controlled depending upon the presence of the free radical generator. In the absence of the free radical generator, the α-methylstyrene carbon-carbon double bonds are substantially less reactive than the carbon-carbon double bonds of acrylates, methacrylates, methacrylamides, and acrylamides. Indeed, the reactivity of the α-methylstyrene carbon-carbon double bond is sufficiently low in the absence of the free radical generator such that the radiation curable binders of the present invention undergo substantially no crosslinking during dispersion milling or even when irradiated with as much as 10 Mrads of electron beam radiation.

Yet, in the presence of the free radical generator, the α-methylstyrene carbon-carbon double bond readily undergoes crosslinking when exposed to radiation to provide a crosslinked polymer network. In the practice of the present invention, the free radical generator is not combined with the other components of the magnetizable layer until just before these components are coated onto the substrate. In this way, premature crosslinking and gellation are minimized during milling, yet the magnetizable layer can be easily cured with radiation after coating.

Although the reason for the variable reactivity characteristics of the radiation curable polymer is not known, a possible rationale can be suggested. It is believed that irradiation of the radiation curable polymer creates polymer radicals that, in the absence of the free radical generator, are too short-lived to achieve crosslinking of the α-methylstyrene carbon-carbon double bond. However, in the presence of the free radical generator, the polymer radicals are capable of reacting with the free radical generator to produce longer-lived radicals that can subsequently achieve crosslinking of the α-methylstyrene carbon-carbon double bond. An alternative mechanism may also be suggested. According to this alternative mechanism, the pendant α-methylstyrene moieties of the radiation curable polymer could facilitate entanglement of the radiation curable polymer within a crosslinked network formed by the free radical generator.

DESCRIPTION OF THE PREFERRED EMBODIMENTS

The particular nonmagnetizable substrate of the present invention is not critical and may be any suitable substrate known in the art. Examples of suitable substrate materials include, for example, polyesters such as polyethylene terephthalate ("PET"); polyolefins such as polypropylene; cellulose derivatives such as cellulose triacetate or cellulose diacetate; polymers such as polycarbonate, polyvinyl chloride, polyimide, polyphenylene sulfide, polyacrylate, polyether sulphone, polyether ether ketone, polyetherimide, polysulphone, aramid film, polyethylene 2,6-naphthalate film, fluorinated polymer, liquid crystal polyesters, polyamide, or polyhydric acid; metals such as aluminum, or copper; paper; or any other suitable material.

A magnetizable layer is provided on the substrate. The components of the magnetizable layer comprise a magnetic pigment dispersed in a polymeric binder. The type of magnetic pigment used in the present invention is not critical and may include any suitable magnetic pigment known in the art including iron oxides such as gamma-$Fe_2O_3$ and $Fe_3O_4$; cobalt-modified iron oxides; chromium dioxide, hexagonal magnetic ferrites such as $BaCo_xTi_xFe_{12-2x}O_{19}$ and the like; and metallic pigments such as Fe and the like. The magnetizable layer of the present invention generally comprises from about 50 to 90, preferably about 65 to 90, and more preferably about 70 to 85 percent by weight of magnetic pigment dispersed in the binder. The percent by weight of magnetic pigment is based on the total weight of the magnetizable layer.

The polymeric binder of the present invention is obtained from reactants comprising a free radical generator and a radiation curable polymer. In the practice of the present invention, the radiation curable polymer comprises a plurality of pendant, radiation curable α-methylstyrene moieties of the formula

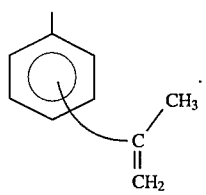

Preferred radiation curable polymers of the present invention may be prepared by reacting a hydroxy functional polymer with an α-methylstyrene functionalized, isocyanate of the formula

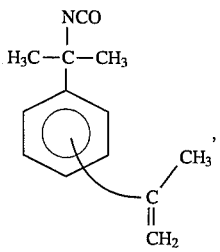

wherein this formula represents

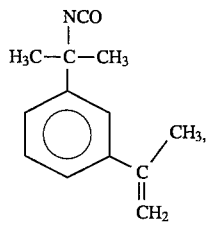

hereinafter referred to as "meta TMI", or

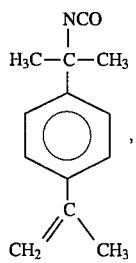

hereinafter referred to as "para TMI". Preferably, the α-methylstyrene functionalized isocyanate is meta TMI. Hereinafter, the term "TMI" without either the meta or para suffix shall mean both meta and para TMI, collectively. TMI has been described in Dexter et al., "M-TMI, A Novel Unsaturated Aliphatic Isocyanate", Journal of Coatings Technology, Vol. 58, No. 737, pp. 43–47 (June 1986); U.S. Pat. No. 4,853,478; U.S. Pat. No. 4,839,230; U.S. Pat. No. 4,788,303; and U.S. Pat. No. 4,617,349.

The hydroxy functional polymer may be any hydroxy functional polymer suitable for use as a binder in magnetic recording media, such as hydroxy functional polyurethanes, alkyd resins, acrylic polymers, polyesters, epoxy resins, cellulose resins, vinyl chloride copolymers, and the like. Self-wetting, hydroxy functional polymers comprising sulfonate groups, carboxyl groups, amine groups, quaternary amine groups, phosphorus-containing groups, and the like, would also be suitable for use as the hydroxy functional polymer in the practice of the present invention. Preferred hydroxy functional polymers contain no pendant acrylate, methacrylate, methacrylamide, or acrylamide moieties and have a hydroxy equivalent weight of from 100 to 10,000, preferably from 200 to 1000, and more preferably from 200 to 500.

One particularly preferred hydroxy functional polymer is a phenoxy resin of the formula

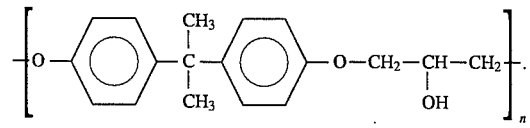

This polymer has a hydroxy equivalent weight of 284 and is commercially available as PKHH UCAR Phenoxy Resin from Union Carbide Corporation. In this formula n has a value in the range from 82 to 123.

The radiation curable polymer may be prepared by reacting the hydroxy functional polymer with TMI such that the hydroxy groups of the hydroxy functional polymer react with the NCO groups of the TMI. This reaction may be represented schematically according to the following reaction scheme:

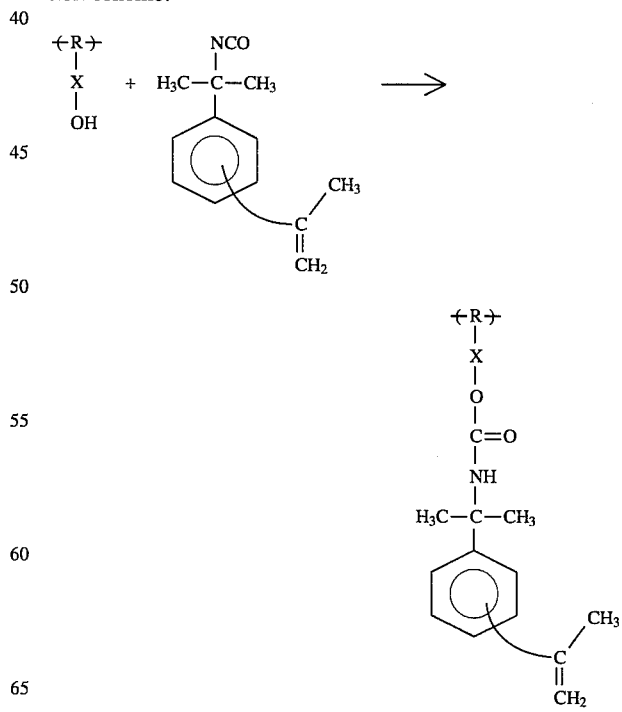

wherein

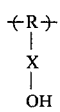

represents a hydroxy functional chain segment of the hydroxy functional polymer, R is a segment of the polymer backbone, and X is a single bond or a linking group that is stable upon exposure to ionizing radiation, e.g., ultraviolet or electron beam radiation. "Stable" means that the linking group does not undergo any scission or crosslinking reactions when exposed to radiation. For example, in the case where the hydroxy functional polymer is the PKHH UCAR phenoxy resin, R is given by the formula

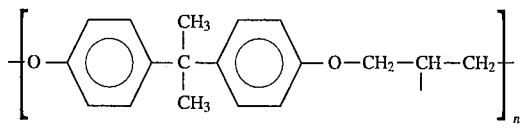

and X is a single bond.

All or only a portion of the hydroxy groups of the hydroxy functional polymer may be reacted with the TMI. Preferably the hydroxy functional polymer is reacted with an amount of TMI such that there is a molar excess of OH groups from the hydroxy functional polymer relative to NCO groups from the TMI. If there is a molar excess of the NCO groups relative to hydroxy groups, then the excess NCO groups could react with themselves, or with water, to generate undesirable side products. When there is a molar excess of OH groups relative to NCO groups, then substantially all of the NCO groups from the TMI will be consumed in the reaction with the hydroxy functional polymer. It is preferred that there is a sufficient excess of OH groups relative to NCO groups such that 10% to 90%, preferably 50% to 80%, and more preferably 80% of the OH groups are reacted with TMI. Generally, reacting a greater percentage of the OH groups from the hydroxy functional polymer with TMI increases the crosslink density and durability of the resulting polymeric binder.

According to one process, the hydroxy functional polymer is reacted with TMI under ambient conditions (i.e., at room temperature and atmospheric pressure) in a suitable solvent. Examples of suitable solvents include ketones such as acetone, methyl ethyl ketone ("MEK"), methyl isobutyl ketone, or cyclohexanone; esters such as methyl acetate, ethyl acetate, butyl acetate, ethyl lactate, or glycol diacetate; tetrahydrofuran; dioxane or the like; and mixtures thereof.

The amount of solvent used is not critical as long as enough solvent is used such that substantially all of the hydroxy functional polymer and the TMI dissolve in the solvent. Generally, using 70% by weight of solvent based on the total weight of the solvent, the TMI, and the hydroxy functional polymer has been found to be suitable in the practice of the present invention. A catalyst, such as dibutyltindilaurate may be added to the solution to accelerate the reaction of the hydroxy functional polymer with the TMI. Optionally, a gellation inhibitor may be added to the solution, although the use of a gellation inhibitor is not required. If a gellation inhibitor is used, the gellation inhibitor may be any gellation inhibitor known in the art. Examples of suitable gellation inhibitors include phenothiazine and butylated hydroxytoluene ("BHT"). The reaction mixture may be stirred slowly as the reaction takes place.

The progress of the reaction between the hydroxy functional polymer and the TMI may be monitored by measuring the IR absorption of the NCO group from the TMI. The reaction is deemed to be complete when an IR absorption for the NCO group of the TMI can no longer be detected. When the reaction is carried out under ambient conditions, the reaction is typically completed after 3 to 4 days.

Examples of acrylates, methacrylates, methacrylamides, and acrylamides suitable for use as free radical generators include hexane diol diacrylate; ethoxylated bisphenol-A-diacrylate; trimethylol propane triacrylate; pentaerythritol triacrylate; pentaerythritol tetraacrylate; dipentaerythritol pentacrylate; tris(2-hydroxyethyl)isocyanurate triacrylate; tetraethylene glycol diacrylate; neopentyl glycol diacrylate; trimethanol propane trimethacrylate; hydantoin hexacrylate; N-N-methylene bisacrylamide; glycidyl methacrylate; benzyl acrylate; isobornyl acrylate; and the like. Of these materials, a preferred free radical generator is pentaerythritol triacrylate ("PETA"), which is a compound of the formula

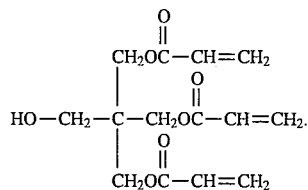

PETA is commercially available as Sartomer 444 from Sartomer Company. Another preferred free radical generator is an aromatic urethane hexacrylate oligomer commercially available as Ebecryl 220 from Radcure Specialties, Inc.

The free radical generator is used in an amount effective to induce crosslinking of the α-methylstyrene moieties of the radiation curable polymer when the radiation curable polymer is exposed to ionizing radiation, e.g., ultraviolet radiation or electron beam radiation. Generally, using from 20 to 80 parts by weight, preferably 25 to 50 parts by weight, and more preferably 30 to 40 parts by weight of the free radical generator based upon 100 parts by weight of the radiation curable polymer is suitable in the practice of the present invention.

In addition to the radiation curable polymer and the free radical generator, it is preferred that the components of the magnetizable layer also include a Tg-lowering agent. The term "Tg" means glass transition temperature. In the practice of the present invention, the Tg-lowering agent is a monomeric, oligomeric, or polymeric material that is miscible with the radiation curable polymer, and has a Tg that is lower than the Tg of the radiation curable polymer. The term "miscible" means that a blend of the radiation curable polymer and the Tg-lowering agent provides a clear solution as well as a clear film when the blend is coated onto a substrate. Examples of Tg-lowering agents include monomeric plasticizers such as diethylphthalate, dibutylphthalate, dioctylphthalate, and the like. Other examples of Tg-lowering agents include polymers having a Tg in the range from −30° C. to 75° C. Preferred Tg-lowering agents include thermoplastic polyurethane polymers that have a Tg of 50° C. or less, preferably 25° C. or less, and more preferably about −25° C. Specific examples of polyurethane polymers that are preferred for use as Tg-lowering agents include the Estane brand polyurethanes commercially available from The B. F. Goodrich Company, which are aromatic polyester polyurethanes end-capped with primary OH groups. Other examples of suitable polyurethanes include the sulfonated, self-wetting polyurethane polymers commercially available from Toyobo Co., Ltd.

Advantageously, when the components of the magnetizable layer include a Tg-lowering agent, irradiating the components of the magnetizable layer with a particular amount of radiation provides a magnetizable layer with a higher crosslink density relative to magnetizable layers having no Tg-lowering agent. Although the precise reason for this advantage is not known with certainty, it is believed that adding the Tg-lowering agent increases the mobility of the radiation curable polymer chains, thereby facilitating the crosslinking of the α-methylstyrene functional moieties. In the practice of the present invention, Tg is measured according to the differential scanning calorimetry ("DSC") technique.

It is also preferred that the components of the magnetizable layer include at least one dispersant to facilitate the dispersion of the magnetic pigment in the polymeric binder. A variety of dispersants may be used in the practice of the present invention, and the particular choice of dispersant will depend, in part, upon the type of magnetic and inorganic pigments that are used. For example, in the case of $\gamma\text{-}Fe_2O_3$ magnetic pigment or carbon black, amine-functional, polymeric dispersants (such as the Disperbyk brand dispersants commercially available from BYK-Chemie U.S.A.) have been found to be suitable in the practice of the present invention.

In the case of higher surface area pigments, e.g., pigments having a surface area of 25 $m^2/g$ to 70 $m^2/g$ such as cobalt-doped $Fe_2O_3$, barium ferrite, and metal particle pigments, a preferred class of dispersants comprises novel monomeric, oligomeric, or polymeric dispersants comprising at least one dispersing moiety and at least one radiation curable moiety of the formula

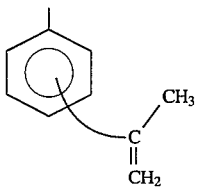

wherein this formula represents

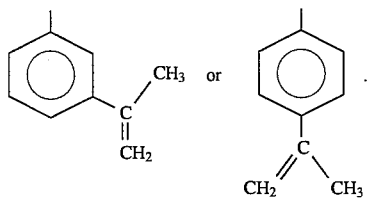

Such dispersants shall be referred to hereinafter as "α-methylstyrene functionalized" dispersants. Examples of suitable dispersing moieties include $-SO_3M$, wherein M is $Na^+$, $K^+$, $Li^+$, $NH_4^+$, and the like; quaternary ammonium moieties;

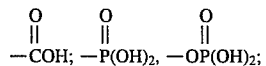

and the like. Advantageously the novel α-methylstyrene functionalized dispersants are capable of crosslinking with the other radiation curable binder materials when exposed to ionizing radiation in the presence of the free radical generator.

One preferred α-methylstyrene functionalized dispersant may be prepared by reacting TMI with a phosphorylated polyoxyalkyl polyol, exemplified by the following formula:

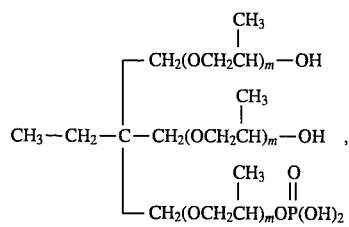

such that the NCO groups of the TMI react with the hydroxy groups of the polyol.

In this formula, m is an integer from 1 to 5. Phosphorylated polyoxyalkyl polyols are described in U.S. Pat. No. 4,889,895. All or only a portion of the hydroxy groups of the phosphorylated polyoxyalkyl polyol may be reacted with NCO groups of the TMI. Preferably, the TMI is reacted with the polyol in an amount such that the ratio of NCO groups to OH groups is about 0.6.

Another preferred difunctional dispersant may be prepared by reacting TMI with a polyoxyalkylated quaternary ammonium polyol such as the Emcol brand dispersing agents commercially available from Witco Chemical, New York, N.Y. The Emcol materials are exemplified by the formula

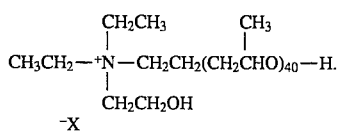

In the above formula, $^-X$ typically is phosphate, acetate, or chloride. All or only a portion of the hydroxy groups of such polyols may be reacted with the NCO groups of the TMI. It is noted that the Emcol materials typically contain other free polyols. Preferably, therefore, the TMI is reacted with such polyols in an amount such that the ratio of NCO groups to OH groups of the polyoxyalkylated quaternary ammonium polyol is about 2.2:1. In this way, all of the hydroxy groups of the other polyols and the polyoxyalkylated quaternary ammonium polyol are reacted with TMI.

In addition to the radiation curable polymer, the free radical generator, the Tg-lowering agent, the dispersant, and the magnetic pigment, the magnetizable layer of the present invention may also comprise one or more conventional additives such as lubricants; abrasives; thermal stabilizers; antioxidants; antistatic agents; fungicides; bacteriocides; surfactants; coating aids; nonmagnetic pigments; and the like in accordance with practices known in the art.

According to a preferred method of preparing magnetic recording media of the present invention, the magnetic pigment, the radiation curable polymer, and a suitable solvent are milled in a first step to form a homogeneous magnetic dispersion. Optionally, either all or a portion of the Tg-lowering agent, the dispersant, and any conventional additives, if any of these are used, may also be milled in this first step. In this first step, using 30 to 75, and more preferably 45 to 65, percent by weight of solvent based on the total weight of the magnetic pigment, the radiation curable polymer, the Tg-lowering agent, and any other additives has been found to be suitable in the practice of the present invention.

Next, in a second step, the free radical generator and additional solvent are blended with the magnetic dispersion just prior to coating the dispersion onto the nonmagnetizable substrate. Optionally, either all or a portion of the Tg-lowering agent and any conventional additives, if any of these are used, may be added to the dispersion during this second step as well as during the first step. In this second step, it is preferred to add a sufficient amount of solvent such that the resulting dispersion is comprised of 45 to 75 percent by weight of the solvent based on the total weight of the dispersion.

Examples of suitable solvents for preparing the magnetic dispersion may include ketones such as acetone, methyl ethyl ketone ("MEK"), methyl isobutyl ketone, or cyclohexanone; alcohols such as methanol, ethanol, propanol, or butanol; esters such as methyl acetate, ethyl acetate, butyl acetate, ethyl lactate, or glycol diacetate; tetrahydrofuran; glycol ethers such as ethylene glycol dimethyl ether, or ethylene glycol monoethyl ether; dioxane or the like; aromatic hydrocarbons such as benzene, toluene, or xylene; aliphatic hydrocarbons such as hexane or heptane; nitropropane or the like; and mixtures thereof.

After blending the free radical generator, additional solvent, and other ingredients, if any, into the magnetic dispersion, the magnetic dispersion is then coated onto the nonmagnetizable substrate. The dispersion may be applied to the nonmagnetizable substrate using any conventional coating technique, such as gravure coating techniques or knife coating techniques. The coated substrate may then be passed through a magnetic field to orient the magnetic pigment, after which the coating is dried, calendered if desired, and then cured with ionizing radiation.

Curing may be achieved using any type of ionizing radiation, e.g., electron beam radiation or ultraviolet radiation, in accordance with practices known in the art. When ultraviolet radiation is used to achieve curing, a photoinitiator is added to the dispersion at the same time that the free radical generator is added to the dispersion. One example of a suitable photoinitiator is commercially available as Irgacure 651 from CIBA-GEIGY Corp. Generally, using 1 to 10 parts by weight of the photoinitiator based on 100 parts weight of the free radical generator has been found to be suitable in the practice of the present invention.

Preferably, curing is achieved with an amount of electron beam radiation in the range from 1 to 20 Mrads, preferably 4 to 12 Mrads, and more preferably 5 to 9 Mrads of electron beam radiation having an energy in the range from 100 to 400 kev, preferably 200 to 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising flue gas, nitrogen, or a noble gas and having an oxygen content of less than 500 parts per million ("ppm"). A preferred inert atmosphere is a nitrogen atmosphere having an oxygen content of less than 75 parts per million.

An alternative embodiment of the present invention is a magnetic recording medium comprising a nonmagnetizable substrate having first and second major surfaces. A magnetizable layer is provided on the first major surface, and a backside coating is provided on the second major surface. The backside coating is prepared from components which comprise a polymeric binder, wherein the polymeric binder is obtained from reactants comprising the free radical generator and the radiation curable polymer as described above.

In addition to the radiation curable polymer and the free radical generator, backside coatings of the present invention may also comprise one or more conventional additives such as lubricants; abrasives; thermal stabilizers; antioxidants; dispersants; wetting agents; antistatic agents; fungicides; bacteriocides; surfactants; coating aids; nonmagnetic pigments; and the like in accordance with practices known in the art.

In a particularly preferred embodiment of the present invention, both the magnetizable layer and the backside coating comprise a polymeric binder obtained from reactants comprising the free radical generator and the radiation curable polymer as described above.

The present invention will now be further described with regard to the following examples.

EXAMPLE 1

Preparation of Radiation Curable Polymers

Radiation curable polymer samples of the present invention were prepared under ambient conditions by reacting a hydroxy functional polymer (PKHH UCAR phenoxy resin commercially available from Union Carbide Corporation) with meta-TMI in the following amounts:

| Sample | Parts by weight of Hydroxy Functional Polymer | Parts by weight of meta-TMI | % OH groups reacted with meta-TMI |
| --- | --- | --- | --- |
| 1 | 100.0 | 14.16 | 20 |
| 2 | 100.0 | 35.40 | 50 |
| 3 | 100.0 | 42.46 | 60 |
| 4 | 100.0 | 56.62 | 80 |

For each sample, the hydroxy-functional polymer was first dissolved in 233 parts by weight methyl ethyl ketone. Next, 200 ppm (based on total weight of the hydroxy functional polymer and the meta-TMI) of BHT gellation inhibitor and 0.15 weight percent (based on the total weight of the hydroxy functional polymer and the meta-TMI) of dibutyltindilaurate catalyst were added to the solution with mixing. The meta-TMI was then slowly added with mixing. After all of the meta-TMI had been added, the reaction between the hydroxy-functional polymer and the meta-TMI was monitored by measuring the IR absorption peak of the NCO group (2250 $cm^{-1}$) from the meta-TMI. The reaction was deemed to be complete when an IR absorption peak for the NCO group could no longer be detected.

Based upon a 15,000 gram batch, a maximum exotherm occurred about 1 hour after the meta-TMI had been added to the reaction mixture. After the maximum exotherm temperature was reached, the reaction mixture was heated to maintain the reaction mixture at 120° F.

After the reaction is complete, the reaction mixture was cooled to room temperature. Optionally at this time, additional methyl ethyl ketone may be added to the reaction mixture in order to reduce the weight percent solids to about 33% solids. Adding additional solvent in this manner lowers the viscosity of the reaction mixture, thereby facilitating subsequent processing.

The Tg of Samples 1, 2, 3, and 4 were 80° C., 72° C., 68° C. and 65° C. respectively, as measured using the DSC technique.

EXAMPLE 2

Preparation of Magnetic Recording Medium

A magnetic dispersion of the present invention was prepared from the following ingredients:

| Ingredient | Parts by Weight |
| --- | --- |
| $\gamma$-$Fe_2O_3$ | 100.00 |
| Carbon black | 5.00 |
| $Al_2O_3$ | 7.00 |
| Phosphate acid ester acrylate commercially available as L-51 from Lord Corporation (50% by weight in tetrahydrofuran) | 10.00 |
| Emcol Phosphate | 2.00 |
| Radiation curable polymer (Sample 3 from Example 1) (32% by weight in methyl ethyl ketone) | 67.50 |
| Methyl ethyl ketone | 135.48 |

To prepare the dispersion, these ingredients were combined and then milled until smooth.

One 50.4 gram aliquot of the dispersion was blended with 1.11 grams of PETA. The resulting mixture was then coated onto a 3 mil, pre-primed polyester film, dried, and cured with 10 Mrads of electron beam radiation (200 keV) in an inert atmosphere containing less than 75 ppm $O_2$.

The resulting magnetic recording medium was tested for crosslink density using the "MEK double rub" test. According to this test, the sample was rubbed vigorously with back and forth rubs using a paper towel that had been soaked in methyl ethyl ketone. Failure occurred when the rubbing action broke through the magnetic coating to the polyester film. The magnetic coating of this sample was not broken through to the polyester film until after 30 back and forth rubs.

EXAMPLE 3

Preparation of Magnetic Recording Medium

A magnetic recording medium was prepared using the procedure of Example 2 except that hydantoin hexacrylate was used in place of PETA. The resulting magnetic recording medium passed the MEK double rub test without showing any break through to the polyester film until after 10 back and forth rubs.

EXAMPLE 4

Preparation of Magnetic Recording Medium

A magnetic recording medium was prepared using the procedure of Example 2 except that tris(2-hydroxyethyl) triacrylate (available as Sartomer 368 from Sartomer Co.) was used in place of PETA. The resulting magnetic recording medium passed the MEK double rub test without showing any break through to the polyester film until after 20 back and forth rubs.

EXAMPLE 5

Preparation of Magnetic Recording Medium

In a first step, 100.00 parts by weight gamma-$Fe_2O_3$, 9.00 parts by weight of carbon black, 24.14 parts by weight of Disperbyk-160 (29% by weight solution of a polyurethane polymer having pendant tertiary amine wetting groups commercially available from BYK-Chemie U.S.A.), 18.09 parts by weight of a 33% by weight solution of a radiation curable polymer (prepared in accordance with Sample 4 from Example 1) in methyl ethyl ketone, 59.73 parts by weight of a 15% by weight solution of a polyurethane polymer (Estane 5703 commercially available from The B. F. Goodrich Company) in a solvent (85% by weight methyl ethyl ketone, 15% by weight toluene), 0.07 parts by weight of propyl gallate stabilizer, 0.07 parts by weight of another stabilizer (commercially available as Irgafos 168 from CIBA-GEIGY Corp.), and 93.4 parts by weight of methyl ethyl ketone were combined and milled until smooth to form a homogeneous solution.

Next, 12.4 parts by weight of pre-dispersed alumina, 9.85 parts by weight of an aromatic urethane hexacrylate oligomer (Ebycryl 220 commercially available from Radcure Specialties, Inc.), 1.00 parts by weight myristic acid, 4.00 parts by weight isocetyl stearate, 0.23 parts by weight diiodomethyl-para-tolylsulfone (available as Amical-48 from Angus Chemical Co.), and 134.2 parts by weight methyl ethyl ketone were sequentially blended into the dispersion in the order listed. As used in this example, "pre-dispersed" alumina means that 100 parts by weight of alumina had previously been dispersed in 40.1 parts by weight of methyl ethyl ketone, 18.2 parts by weight of a radiation curable polymer (prepared in accordance with Sample 2 from Example 1), 20.7 parts by weight of Disperbyk-160, 0.07 parts by weight of propyl gallate, and 0.07 parts by weight of Irgafos 168.

The resulting blend was then gravure coated onto both sides of a 3-mil, pre-primed polyester substrate at a 90 microinch caliper. The coated substrate was then passed through a randomizer, dried in an oven at 160° F., calendered, and cured with 10 Mrads of electron beam radiation (200 keV) in an inert atmosphere comprising no more than 75 ppm $O_2$. The resulting magnetic recording medium showed a 60° gloss of 120 and a squareness of 0.50. The resulting media would be particularly suitable for forming magnetic recording diskettes.

EXAMPLE 6

Preparation of $\alpha$-Methylstyrene Functionalized Dispersant 100.0 parts by weight of Emcol Phosphate quaternary ammonium polyol (0.0909 equivalents of OH) 0.03 parts by weight of BHT, and 0.28 parts by weight dibutyltindilaurate were dissolved in 140.5 parts by weight of methyl ethyl ketone. Next 40.2 parts by weight of meta-TMI (0.2000 equivalents of NCO) was slowly added at room temperature. The resulting reaction mixture was stirred for 30 minutes. After 30 minutes, stirring was stopped, and the reaction was allowed to proceed. The reaction was complete after i day when an IR absorption for NCO at 2250 $cm^{-1}$ could no longer be detected. Three hours after the meta-TMI had been added, a 1500 gram batch showed a maximum exotherm of 36° C. The resulting $\alpha$-methylstyrene functionalized dispersant shall be referred to hereinafter as "Dispersant I".

EXAMPLE 7

Preparation of $\alpha$-Methylstyrene Functionalized Dispersant 133.33 parts by weight of a 75% solution of a phosphorylated polyoxyalkyl diol (0.238 equivalents OH) in toluene, 0.03 parts by weight BHT, and 0.28 parts by weight dibutyltindilaurate were dissolved in 38.37 parts by weight toluene. Next, 28.70 parts by weight meta-TMI (0.143 equivalents NCO) was slowly added at room temperature. The resulting reaction mixture was stirred for 30 minutes. After 30 minutes, stirring was stopped, and the reaction was allowed to proceed. The reaction was complete after 2 days when an IR absorption for NCO at 2250 cm$^{-1}$ could no longer be detected. Six hours after the meta-TMI had been added, a 10,000 gram batch showed a maximum exotherm of 37° C. The resulting α-methylstyrene functionalized dispersant shall be referred to hereinafter as "Dispersant II".

EXAMPLE 8

Preparation of Magnetic Recording Medium 0.075 parts by weight of Irgafos 168 stabilizer (CIBA-GEIGY Corp.), 0.075 parts by weight of propyl gallate, 6.39 parts by weight of a 76.7% by weight solution of Dispersant II in toluene, and then 1.10 parts by weight of a 50% by weight solution of Dispersant I in methyl ethyl ketone were sequentially added into 73.35 parts by weight of methyl ethyl ketone. The resulting mixture was then mixed in a high shear mechanical mixer for 10 minutes.

Next, 100.00 parts by weight of Co-γ-Fe$_2$O$_3$ magnetic pigment having a surface area of 40 m$^2$/g was slowly added to the mixture. After adding the pigment, the mixture was mixed in a high shear mechanical mixer for an additional 1.5 hours.

Next, 13.20 parts by weight of pre-dispersed alumina, 16.31 parts by weight of a 34.7% by weight solution of a radiation curable polymer (prepared in accordance with Sample 4 of Example 1) in methyl ethyl ketone, and then 70.13 parts by weight of a 15% by weight solution of Estane 5703 in a solvent (85% by weight methyl ethyl ketone, 15% by weight toluene) were slowly added sequentially into the mixture. The mixture was then mixed for an additional 1.5 hrs in the high shear mechanical mixer. After this, the mixture was milled pass to pass until smooth in a horizontal sand mill using ceramic media.

As used in this Example 8, "pre-dispersed" alumina means that 100 parts by weight of alumina had previously been dispersed in 1 part by weight Emcol Phosphate, 1.3 parts by weight of a 75% by weight solution of phosphorylated polyoxyalkyl polyol in toluene, 30.6 parts by weight methyl ethyl ketone, and 3.4 parts by weight of cyclohexanone.

Next, 6.50 parts by weight of carbon black, 5.00 parts by weight of a 40% by weight solution of BYK LP-M 5960 (amine-functional polymeric dispersant available from BYK-Chemie GmbH) in cyclohexanone and then 6.60 parts by weight of methyl ethyl ketone were sequentially blended into the mixture. The mixture was then mixed in the high shear mechanical mixer for 1.5 hrs. After mixing, the mixture was milled pass to pass until smooth in the horizontal sand mill.

Just prior to coating the resulting magnetic recording dispersion onto a substrate, to 100 parts by weight of the magnetic dispersion, the following ingredients were added in order under high shear mixing: 0.33 parts by weight of myristic acid, 1.67 parts by weight of isocetyl stearate, 3.38 parts by weight of Ebecryl 220, and 69.2 parts by weight of methyl ethyl ketone.

The resulting blend was then gravure coated onto both sides of a 3 mil, pre-primed polyester substrate at a 45 microinch caliper. The coated substrate was then passed through a randomizer, dried in an oven at 160° F., calendered, and cured with 10 Mrads of electron beam radiation (200 keV) in an inert atmosphere comprising no more than 75 ppm O$_2$. The resulting magnetic recording medium showed a squareness of 0.7, a 60° gloss of 130, and a remanence, B$_R$, of 800 gauss. The resulting magnetic recording medium would be particularly suitable for forming magnetic recording diskettes.

EXAMPLE 9

Preparation of Magnetic Recording Medium 0.033 parts by weight of tetramethylthiuram disulfide, 0.033 parts by weight propyl gallate, 3.48 parts by weight of a 75% by weight solution of Dispersant II in toluene, and then 0.66 parts by weight of a 50% by weight solution of Dispersant I in methyl ethyl ketone were sequentially added to 28.7 parts by weight of methyl ethyl ketone. The resulting mixture was then mixed in a high shear mechanical mixer for 10 minutes.

Next, 43.50 parts by weight of Co-γ-Fe$_2$O$_3$ magnetic pigment having a surface area of 40 m$^2$/g was slowly added to the mixture. After adding the pigment, the mixture was mixed in a high shear mechanical mixer for an additional 1.5 hours.

Next, 11.80 parts by weight of a 36.0% by weight solution of a radiation curable polymer (prepared in accordance with Sample 2 of Example 1) in methyl ethyl ketone and then 18.93 parts by weight of a 15% by weight solution of Estane 5703 in methyl ethyl ketone were slowly added sequentially into the mixture. The mixture was then mixed in a high shear mechanical mixer for an additional 1.5 hr. The mixture was then milled pass to pass until smooth in a horizontal sand mill using ceramic media.

Next, 3.04 parts by weight of carbon black, 2.18 parts by weight of a 40.0% by weight solution of BYK LP-M 5960 (amine functional polymeric dispersant available from BYK-Chemie GmbH) in cyclohexanone, and then 9.94 parts by weight of methyl ethyl ketone were sequentially added to the mixture. The mixture was then mixed in the high shear mechanical mixer for ½ hr. After this, the mixture was milled in the horizontal sand mill pass to pass until smooth.

Just prior to coating the resulting magnetic dispersion onto a substrate, to 100 parts by weight of the magnetic dispersion, the following ingredients were added in order under high shear mixing: 0.36 parts by weight of myristic acid, 1.78 parts by weight of isocetyl stearate, 4.96 parts by weight of pre-dispersed alumina, 2.51 parts by weight of Ebecryl 220, and 63.42 parts by weight of methyl ethyl ketone. The pre-dispersed alumina used in this Example was the same as the pre-dispersed alumina of Example 8.

The magnetic dispersion was then gravure coated onto both sides of a 3 mil, pre-primed polyester substrate at a 48 microinch caliper. The coated substrate was then passed through a randomizer, dried in an oven at 160° F., calendered, and cured with 10 Mrads of electron beam radiation (200 keV) in an inert atmosphere comprising no more than 75 ppm O$_2$. The resulting magnetic recording medium showed a squareness of 0.45, a 60° gloss of 135, a remanence of 700 gauss, and would be particularly suitable for forming magnetic recording diskettes.

EXAMPLE 10

Preparation of Magnetic Recording Medium 100.00 parts by weight of barium ferrite magnetic pigment, 6.70 parts by weight of alumina, 6.7 parts by weight Dispersant II at 75% solids in toluene, 1.5 parts by weight Dispersant I at 50% solids in methyl ethyl ketone, 8.7 parts by weight of a radiation curable polymer (prepared in accordance with Sample 2 of Example 1) at 35% solids in methyl ethyl ketone, and then 20.3 parts by weight of Estane 5703 at 15% solids in a solvent (85% by weight methyl ethyl ketone, 15% by weight toluene) were added to 138 parts by weight of methyl ethyl ketone. The mixture was mixed in a high shear mechanical mixer for 1 hour and then milled pass to pass until smooth in a horizontal sand mill using ceramic media.

Next, 5.0 parts by weight Disperbyk 161 (amine functional polymeric dispersant available from BYK-Chemie U.S.A.) at 30% solids in methyl ethyl ketone, 3.30 parts by weight carbon black, and enough methyl ethyl ketone to dilute the mixture to 40% solids were sequentially added to the mixture. The mixture was then mixed in the high shear mechanical mixer for an additional 30 minutes and then milled pass to pass in the horizontal sand mill until smooth.

Just prior to coating the resulting magnetic dispersion onto a substrate, 2.60 parts by weight lubricant, 2.76 parts by weight Ebecryl 220, and enough methyl ethyl ketone to dilute the dispersion to 35% solids were sequentially blended into the dispersion using high shear mixing.

The magnetic dispersion was then gravure coated onto both sides a 3 mil, pre-primed polyester substrate at a 100 microinch caliper. The coated substrate was then dried in an oven at 160° F., calendered, and cured with 10 Mrads of electron beam radiation (200 keV) in an inert atmosphere comprising no more than 75 ppm $O_2$. The resulting magnetic recording medium would be particularly suitable for forming magnetic recording diskettes.

EXAMPLE 11

Preparation of Magnetic Recording Medium 0.015 parts by weight of Irgafos 168, 0.015 parts by weight of propyl gallate, and then 0.83 parts by weight of a 75% by weight solution of Dispersant II in toluene were sequentially added to 19.88 parts by weight of methyl ethyl ketone. The resulting mixture was mixed with a high shear mechanical mixer for 10 minutes.

Next, 20.0 parts by weight of barium ferrite magnetic pigment were slowly added to the mixture. After this, the mixture was mixed in the high shear mixer for an additional 1.5 hours.

Next, 3.01 parts by weight of a 35.1% by weight solution of a radiation curable polymer (prepared in accordance with Sample 4 of Example 1) and then 2.50 parts by weight of a 30% by weight solution of Toyobo UR8300 (a sulfonated polyurethane polymer available from Toyobo Co., Ltd.) were slowly added sequentially to the mixture. The mixture was then mixed in the high shear mixer for 1.5 hours and then milled pass to pass until smooth in a horizontal sand mill using ceramic media.

Next, 3.60 parts by weight of carbon black and then 7.18 parts by weight of methyl ethyl ketone were sequentially added to the mixture. The mixture was then mixed in the high shear mixer for ½ hour and then milled pass to pass in the horizontal sand mill until smooth.

Next, 2.28 parts by weight of pre-dispersed alumina was added to the mixture. After this, the mixture was mixed for ½ hour with the high shear mixer and then milled pass to pass in the horizontal sand mill until smooth. The pre-dispersed alumina used in this Example was the same as the pre-dispersed alumina of Example 5.

Just prior to coating, to 100 parts by weight of the resulting magnetic dispersion, the following ingredients were added to the magnetic dispersion in order under high shear mixing as follows: 0.097 parts by weight of myristic acid, 0.84 parts by weight of isocetyl stearate, 1.58 parts by weight of Ebecryl 220, and 22.57 parts by weight of methyl ethyl ketone.

The magnetic dispersion was then knife coated onto a 3 mil, pre-primed polyester substrate at a 100 microinch caliper. The coated substrate was then dried in an oven at 160° F., calendered, and cured with 10 Mrads of electron beam radiation (200 keV) in an inert atmosphere comprising no more than 75 ppm $O_2$. The resulting magnetic recording medium would be particularly suitable for forming magnetic recording diskettes.

EXAMPLE 12

Preparation of Magnetic Recording Medium a. Preparation of Backside Dispersion 1.2 lbs (0.54 kg) of a 75% by weight solution of Dispersant II in toluene, 11.7 lbs (5.31 kg) of a 35% by weight solution of a radiation curable polymer (prepared in accordance with Sample 3 of Example 1) in methyl ethyl ketone, and then 18.2 lbs (8.25 kg) of a 15% by weight solution of Estane 5703 in a solvent (85% by weight methyl ethyl ketone, 15% by weight toluene) in methyl ethyl ketone were sequentially added to 12.9 lbs (5.85 kg) of methyl ethyl ketone. The resulting mixture was mixed with an enclosed high shear mechanical mixer for 10 minutes.

Next, 4.95 lbs (2.24 kg) of carbon black was slowly added to the mixture. After this, the mixture was mixed in the high shear mechanical mixer for 1 hour.

Next, 11.0 lbs (4.99 kg) of $TiO_2$ was slowly added to the mixture. After this, the mixture was mixed with the high shear mechanical mixer for 1 hour. The mixture was then milled pass to pass until smooth in a sandmill.

Just prior to coating the resulting backside dispersion onto a substrate, 2.92 lbs (1.32 kg) of Ebecryl 220 and 0.13 lbs (60 grams) of myristic acid were blended into the dispersion. The dispersion was also diluted to 20% solids with methyl ethyl ketone and cyclohexanone, wherein the cyclohexanone was used in an amount such that the total amount of solvent in the dispersion was comprised of 18% by weight of cyclohexanone.

b. Preparation of magnetic dispersion 4 grams of propyl gallate, 4 grams of Irgafos 168, 333 grams of a 75% by weight solution of Dispersant II in toluene, 25 grams of Emcol Phosphate, 2.5 lbs (1.1 kg) of a 35% by weight solution of a radiation curable polymer (prepared in accordance with Sample 2 of Example 1) in methyl ethyl ketone, and then 4.3 lbs (1.9 kg) of a 15% by weight solution of Estane 5703 in a solvent (85% by weight methyl ethyl ketone, 15% by weight toluene) were sequentially added to 3.86 lbs (1.75 kg) of methyl ethyl ketone. The resulting mixture was mixed in an enclosed high shear mixer for 10 minutes. The mixing apparatus was then purged with $N_2$ gas.

Next, 11.0 lbs (4.99 kg) of Fe metal particle magnetic pigment and then 0.85 lbs (0.38 kg) of alumina were slowly added sequentially to the mixture. The mixture was then mixed under the N₂ atmosphere in the high shear mixer for an additional 2 hours.

Next, 11.7 lbs (5.31 kg) of methyl ethyl ketone was added to the mixture. The mixture was then mixed with the high shear mixer for an additional 1 hour. After this, the mixture was milled pass to pass in a sandmill until smooth using ceramic media.

Just prior to coating the resulting magnetic dispersion onto a substrate, 0.748 lbs (0.339 kg) Ebecryl 220, 0.24 lbs (0.11 kg) of myristic acid, and 0.12 lbs (0.054 kg) of butyl stearate were blended into the dispersion. The dispersion was also diluted to 32% solids with methyl ethyl ketone and cyclohexanone, wherein the cyclohexanone was used in an amount such that the total amount of solvent in the dispersion was comprised of 18% by weight cyclohexanone.

c. Coating the dispersions onto a pre-primed substrate

The backside dispersion was coated onto one side of a thin gauge, pre-primed polyester substrate. The coated substrate was then dried at 140° F. Next, the magnetic dispersion was coated onto the other side of the pre-primed polyester substrate. The coated substrate was then passed through a magnetic field (4700 to 5400 Gauss) to orient the magnetic pigment. After this, the coated substrate was again dried at 140° F., and then the magnetic coating and the backside coating were calendered. The backside coating and the magnetic coating were then cured with 8 megarads of electron beam radiation in a N₂ atmosphere containing no more than 50 ppm O₂.

The resulting magnetic recording medium showed a squareness of 0.803, a coercivity of 1497 Oe, and a remanence of 2650 gauss. All electromagnetic measurements were made with a vibrating sample magnetometer ("VSM") at 12.5 kOe.

EXAMPLE 13

Preparation of Magnetic Recording Medium

A magnetic recording medium was prepared as described in Example 12, except that the magnetic dispersion was prepared as follows:

333 grams of a 75% by weight solution of Dispersant II in toluene, 50 grams of a 50% by weight solution of Dispersant I in methyl ethyl ketone, 2.5 lbs (1.1 kg) of a 35% by weight solution of a radiation curable polymer (prepared in accordance with Sample 2 of Example 1) in methyl ethyl ketone, and then 4.3 lbs (1.95 kg) of a 15% by weight solution of Estane 5703 in a solvent (85% by weight methyl ethyl ketone, 15% by weight toluene) were sequentially added to 3.81 lbs (1.73 kg) of methyl ethyl ketone. The resulting mixture was mixed in a high shear mixer for 10 minutes. The mixing apparatus was then purged with N₂ gas.

Next, 11.0 lbs (4.99 kg) of Fe metal particle magnetic pigment and then 0.85 lbs (.38 kg) of alumina were slowly added sequentially to the mixture. After this, the mixture was then mixed under the N₂ atmosphere for an additional 2 hours.

Next, 11.7 lbs (5.31 kg) of methyl ethyl ketone was added to the mixture, and the mixture was then mixed for an additional 1 hour. After this, the mixture was milled pass to pass in a sandmill with ceramic media until smooth.

Just prior to coating the resulting magnetic dispersion onto a substrate, 0.75 lbs of Ebecryl 220, 0.24 lbs (0.11 kg) of myristic acid, and then 0.12 lbs (0.054 kg) of butyl stearate were blended into the dispersion. The dispersion was also diluted to 32% solids with methyl ethyl ketone and cyclohexanone, wherein the cyclohexanone was used in an amount such that the total solvent in the dispersion was comprised of 18% by weight cyclohexanone.

The resulting magnetic recording medium showed a squareness of 0.788, a coercivity of 1507 Oe, and a remanence of 2481 gauss. All measurements were made using a VSM at 12.5 kOe.

COMPARISON EXAMPLE 1

For comparison purposes, three comparison samples were prepared using the procedures of Examples 2, 3, and 4, respectively, except that a hydroxy functional polymer (PKHH UCAR phenoxy resin available from Union Carbide Corporation) was substituted for the radiation curable polymer. All three comparison samples failed the MEK double rub test in that the magnetic coating of all three comparison samples was broken through during the first back and forth rub.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A method of using an α-methylstyrene functional polymer to make a magnetic recording medium, comprising the steps of:

(a) milling ingredients comprising a magnetic pigment, a radiation curable polymer, and a solvent to form a magnetic dispersion, wherein the radiation curable polymer comprises a plurality of pendant α-methylstyrene moieties of the formula

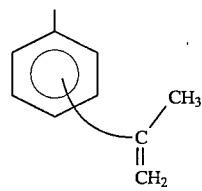

wherein the radiation curable polymer is prepared by reacting a hydroxy functional polymer with an α-methylstyrene functionalized isocyanate, wherein the hydroxy functional polymer contains no pendant acrylate, methacrylate, methacrylamide, or acrylamide moieties and has a hydroxy equivalent weight in the range from 100 to 10,000, and wherein the hydroxy functional polymer and the α-methylstyrene functionalized isocyanate are reacted under conditions such that there is a molar excess of the OH groups of the hydroxy functional polymer relative to the NCO groups of the isocyanate and such that said OH groups react with said NCO groups to form the radiation curable polymer having α-methylstyrene functionality;

(b) blending ingredients comprising a free radical generator and additional solvent into the magnetic dispersion of step (a), wherein the weight ratio of the free radical generator to the radiation curable polymer is in the range 1:5 to 1:1, and wherein the additional solvent is added in an amount such that the magnetic dispersion comprises 45 to 75 weight percent of solvent;

(c) coating the magnetic dispersion of step (b) onto a nonmagnetizable substrate;

(d) optionally, passing the coated nonmagnetizable substrate through a magnetic field in order to orient or randomize the magnetic orientation of the magnetic pigment;

(e) drying the coated nonmagnetizable substrate, whereby a dried magnetic coating on the nonmagnetizable substrate is formed;

(f) optionally, calendering the magnetic coating; and (g) curing the dried magnetic coating with ionizing radiation.

2. The process of claim 1, wherein the free radical generator is selected from the group consisting of acrylates, methacrylates, methacrylamides, and acrylamides.

3. The process of claim 1, wherein the free radical generator is selected from the group consisting of pentaerythritol triacrylate and an aromatic urethane hexacrylate oligomer.

4. The process of claim 1, wherein the radiation curable polymer comprises a plurality of chain segments of the formula

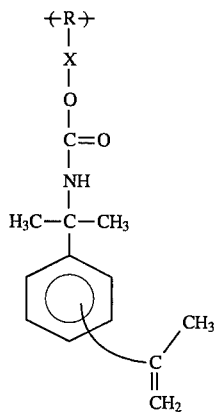

wherein:

R is a segment of the polymer backbone; and

X is a single bond or linking group which is stable under irradiation.

5. The process of claim 1, wherein the radiation curable polymer is obtained by reacting a hydroxy-functional polymer with an α-methylstyrene functional isocyanate of the formula

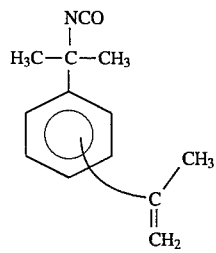

such that the hydroxy groups of the hydroxy functional polymer react with the NCO groups of the α-methylstyrene functional isocyanate.

6. The process of claim 1, wherein there is a sufficient excess of hydroxy groups relative to NCO groups such that 10% to 90% of the hydroxy groups of the hydroxy functional polymer are reacted with the NCO groups of the α-methylstyrene functional isocyanate.

7. The process of claim 6, wherein there is a sufficient excess of hydroxy groups relative to NCO groups such that 50% to 80% of the hydroxy groups of the hydroxy functional polymer are reacted with the NCO groups of the α-methylstyrene functional isocyanate.

8. The process of claim 1, wherein the ingredients of step (a) further comprise a Tg-lowering agent, wherein the weight ratio of the radiation curable polymer to the Tg-lowering agent is in the range from 10:90 to 90:10.

9. The process of claim 1, wherein the ingredients of step (b) further comprise a Tg-lowering agent, wherein the weight ratio of the radiation curable polymer to the Tg-lowering agent is in the range from 10:90 to 90:10.

10. The process of claim 8, wherein the Tg-lowering agent is a monomeric plasticizer selected from the group consisting of diethylphthalate, dibutylphthalate, and dioctylphthalate.

11. The process of claim 9, wherein the Tg-lowering agent is a monomeric plasticizer selected from the group consisting of diethylphthalate, dibutylphthalate, and dioctylphthalate.

12. The process of claim 8, wherein the Tg-lowering agent is a polymer having a Tg in the range from −30° C. to 75° C.

13. The process of claim 9, wherein the Tg-lowering agent is a polymer having a Tg in the range from −30° C. to 75° C.

14. The process of claim 8, wherein the Tg-lowering agent is a thermoplastic polyurethane having a Tg in the range from −30° to 75° C.

15. The process of claim 9, wherein the Tg-lowering agent is a thermoplastic polyurethane having a Tg in the range from −30° to 75° C.

16. The process of claim 4, wherein R has the formula

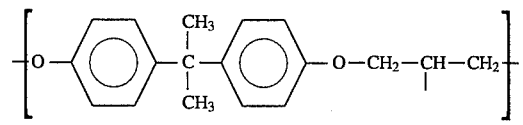

and X is a single bond.

17. The process of claim 1, wherein the magnetic pigment is $\gamma\text{-Fe}_2\text{O}_3$.

18. The process of claim 1, wherein the magnetic pigment is cobalt-doped $\gamma\text{-Fe}_2\text{O}_3$.

19. The process of claim 1, wherein the magnetic pigment is barium ferrite.

20. The process of claim 1, wherein the magnetic pigment is a Fe metal particle magnetic pigment.

* * * * *